March 28, 1939.  A. N. PORTER  2,152,388
SPRING SHACKLE
Filed June 9, 1937
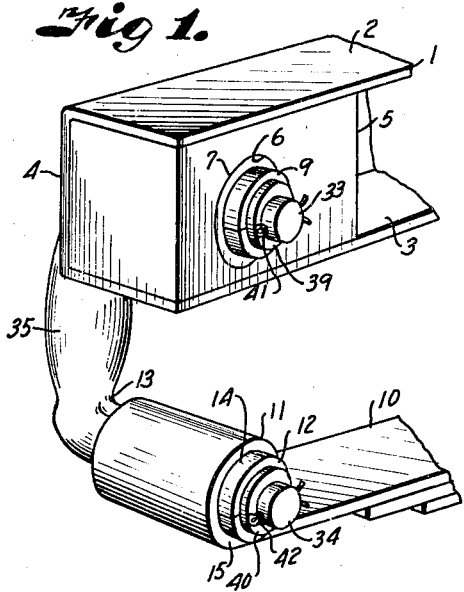
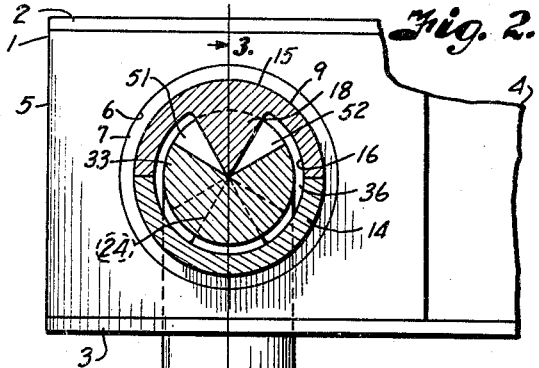
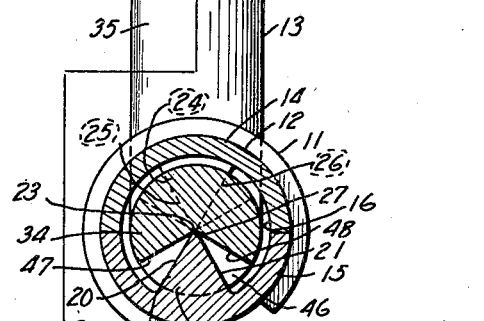
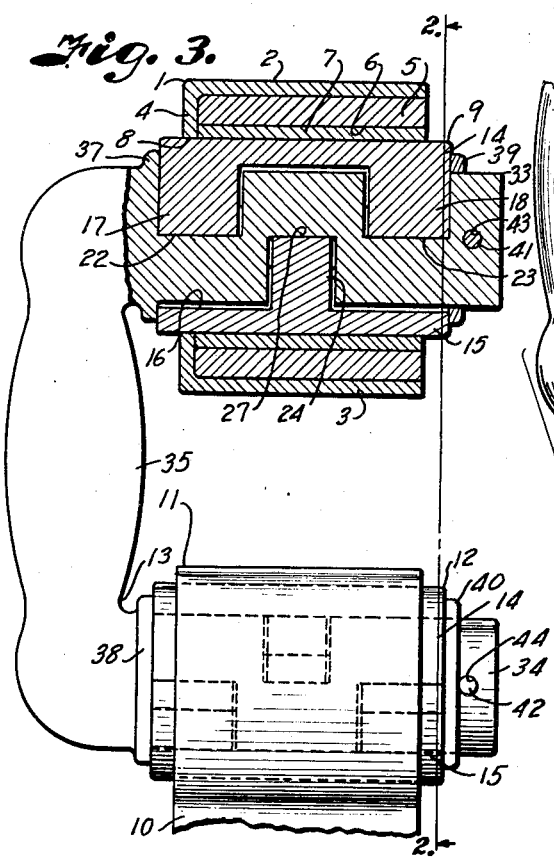
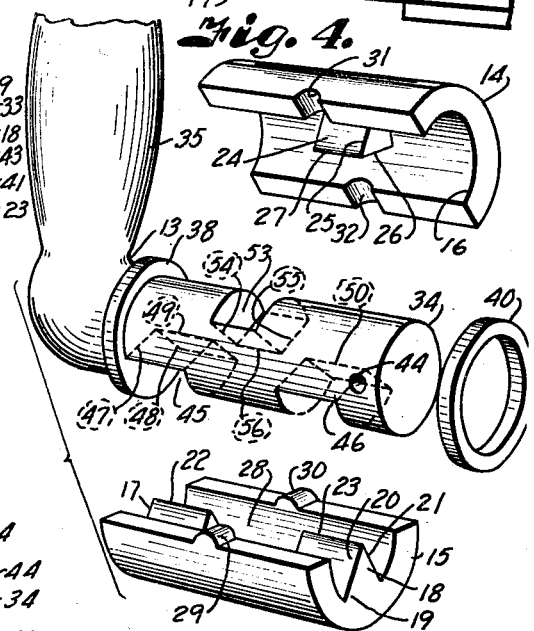
INVENTOR
Albert N. Porter
BY
ATTORNEY Patented Mar. 28, 1939

2,152,388

UNITED STATES PATENT OFFICE 2,152,388

SPRING SHACKLE

Albert N. Porter, Tulsa, Okla., assignor to J. F. Darby, Tulsa, Okla.

Application June 9, 1937, Serial No. 147,259

6 Claims. (Cl. 267—54)

This invention relates to spring shackles, particularly to those of the oilless type, and has for its principal object to provide a shackle having pivotal line bearing contacts arranged radially about an axis of oscillation for supporting loads acting thereon.

It is also an important object of the invention to arrange the line contact portions so that one of the bearing contacts acts in cooperation with a bearing contact on the opposite side of the axis of oscillation to maintain positive engagement during flexure of the spring and movement of a vehicle frame that is connected by the shackle.

Further objects of the invention are to provide a shackle construction that is readily assembled, and to provide a shackle wherein the line bearing contact portions may be formed of wear resisting material having high tensile strength and capable of withstanding torsional strains imparted on the shackle.

In accomplishing these and other objects of the invention, as hereinafter pointed out, I have provided improved details of structure, the preferred form of which is illustrated in the accompanying drawing, wherein:

Fig. 1 is a perspective view of a portion of a vehicle frame and spring connected by a shackle embodying the features of the present invention.

Fig. 2 is an enlarged section through the shackle on the line 2—2 of Fig. 3.

Fig. 3 is a sectional view through the shackle on the line 3—3 of Fig. 2.

Fig. 4 is a detail perspective view of a portion of the shackle showing the bearing sections in disassembled spaced relation with the shank of the shackle frame.

Referring more in detail to the drawing:

1 designates a portion of a conventional vehicle frame ordinarily formed of channels having upper and lower flanges 2 and 3 connected by a vertical web 4. Secured between the flanges at the desired points to mount spring shackles are bearing blocks 5, having a transverse cylindrical opening 6 to mount a bushing 7 which cooperates with an aligning opening 8 in the web of the channel to supportingly retain a bearing member 9.

10 designates a spring having a rolled end 11 for mounting a similar bearing member 12, which cooperates with the bearing member 9 to mount the shackle frame 13. The bearing members 9 and 12 are of identical construction, each being formed of a pair of semicylindrical sections 14 and 15 of suitable diameter to be pressed within the bushing 7 and rolled end 11 of the spring.

The pairs of bearing sections 14 and 15 have inner bores 16 formed axially thereof so that one half of the bore is formed in each of the bearing sections.

Formed in each bearing section 15, at the respective ends thereof, are substantially triangular shaped lugs 17 and 18 with their base portions 19 preferably formed integrally with the bearing section and having converging side faces 20 and 21 intersecting in the axis of the bore 16 to form line bearing contact portions 22 and 23, as best shown in Fig. 4. Each bearing section 14 is provided with a centrally located, triangular shaped lug 24, also formed integrally therewith and having converging side faces 25 and 26 intersecting to form a line bearing contact 27 located in the axis of the bore and in registering alignment with the line contact portions 22 and 23 of the other bearing section. The lug 24 is of less width than the spacing 28 between the lugs 17 and 18. The pairs of bearing sections are retained in alignment by means of transverse ribs or keys 29 and 30 that engage in similarly shaped transverse ways 31 and 32 of the other member to prevent longitudinal shifting movement of the bearing sections relatively to each other.

The shackle frame 13 consists of a U member having spaced, parallel shanks 33 and 34 connected by a bar 35. The shanks 33 and 34 are of cylindrical contour and of smaller diameter than the bores 16 so that they are freely engageable therein and adapted to oscillate free of any frictional contact with the inner faces of the bores, as indicated by the spacing designated 36 in Fig. 2.

The shanks are provided at their bar ends with annular stop collars 37 and 38 that engage against the end faces of the respective bearing members, as shown in Fig. 3. The shanks are of sufficient length to project from the opposite ends of the bearing members to mount washers 39 and 40 that are respectively retained by cotter pins or similar fastening devices 41 and 42 which are projected through suitable openings 43 and 44 extending transversely through the shanks as best shown in Fig. 1. Each shank is provided with spaced recesses 45 and 46 to accommodate the lugs 17 and 18 on the bearing sections 15. The recesses are of substantially triangular shaped cross-section and having converging side faces 47 and 48 intersecting in the axis of the shanks to form aligned bearing contact seats 49 and 50 to seatingly engage the line contact portions 22 and 23 of the lugs.

The side faces of the respective recesses converge at greater angles than the corresponding side faces of the lugs to provide sufficient space to permit oscillation of the shackle relatively to the bearing members, as indicated at 51 and 52 (Fig. 2).

Formed in the opposite diametrical side of each shank is a similar recess 53, having converging sides 54 and 55 terminating in a line bearing seat 56 at substantially the same angles as the corresponding faces of the opposite recesses. The recesses 45, 46 and 53, thus described, are preferably of slightly greater width than the width of the corresponding lugs so that there is no frictional engagement between the ends thereof that would necessitate the use of a lubricant.

In assembling the shackle, the bearing sections 15 carrying the spaced lugs 17 and 18 are placed over the shanks of the shackle frame so that the lugs enter the respective recesses 45 and 46. The complementary sections 14 are then inserted so that the single lugs 24 thereof engage in the recesses 53. When the parts are thus assembled, the line bearing contacts of the respective lugs engage the line bearing seats of the shanks so that the bearing members are free to oscillate about an axis of oscillation extending through the line contacts, the angle of oscillation being limited by the angles of the spaces 51 and 52. The washers 39 and 40 are then sleeved over the outer ends of the shanks and the cotter pins 41 and 42 inserted in their respective openings. The bearing members are then respectively pressed within the bushings 7 and the rolled end of the spring 11 to complete the assembly.

With the shackle frame and bearing members in place, the shackle is free to oscillate relatively to the bearing members on an axis of oscillation extending through the line bearing contacts between the respective lugs and seats. Owing to the radial or opposed relation of the lugs 25 relatively to the lugs 17 and 18, the line bearing portions 27 cooperate with their line bearing seats to positively retain the line bearing portions 22 and 23 in constant engagement with the line bearing seats 49 and 50 so that there is no lost motion between the shanks of the shackle and the bearing members.

Since there is no sliding movement between the shanks and the bearing members, no lubricant is necessary, yet the shackle is free to oscillate about the axis of oscillation as is clearly apparent in Figs. 2 and 3.

What I claim and desire to secure by Letters Patent is:

1. A device of the character described including a pivot member provided with radially arranged recesses having line bearing seat portions, a pair of bearing sections extending over the pivot member, lugs on the bearing sections projecting into said recesses and provided with line bearing contact portions engaging the bearing seat portions to form an axis of oscillation, said bearing sections having abutting faces for maintaining alignment of said line bearing contact portions, and means encircling the bearing sections for retaining the faces of the bearing sections in abutting relation.

2. A device of the character described including a pivot member provided with radially arranged recesses having line bearing seat portions, a pair of bearing sections extending over the pivot member, lugs on the bearing sections projecting into said recesses and provided with line bearing contact portions engaging the bearing seat portions to form an axis of oscillation, said bearing sections having abutting faces for maintaining alignment of said line bearing contact portions, and a sleeve pressed over said bearing sections for retaining the faces of the bearing sections in abutting relation.

3. A device of the character described including a cylindrical pivot member provided with radially arranged recesses having line bearing seat portions, a pair of semi-cylindrical bearing members forming a bore for receiving the pivot member, lugs on the semicylindrical bearing members projecting into the recesses and provided with line bearing contact portions engaging the bearing seat portions to form an axis of oscillation, and a sleeve extending over the bearing members to maintain said axis of oscillation.

4. A device of the character described including a cylindrical pivot member provided with radially arranged recesses having line bearing seat portions, a pair of semicylindrical bearing members forming a bore for receiving the pivot member, lugs on the semicylindrical bearing members projecting into the recesses and provided with line bearing contact portions engaging the bearing seat portions to form an axis of oscillation, a sleeve extending over the bearing members to maintain said axis of oscillation, and means for preventing independent longitudinal movement of said bearing members within the sleeve.

5. A spring shackle including a shackle frame having parallel spaced shank portions provided with radially arranged recesses having line bearing seat portions, bearing sections extending around said shank portions, lugs on the bearing sections engageable in said recesses and provided with line bearing contact portions engaging the bearing seat portions to form axes of oscillation for said shank portions, said bearing sections having abutting faces for maintaining said axes of oscillation, and sleeve members housing the bearing sections for retaining the faces thereof in abutting relation.

6. A spring shackle including a shackle frame having parallel spaced shank portions provided with opposed radially arranged recesses having line bearing seat portions in the axes of said shank portions, semicylindrical bearing sections extending over said shank portions and having abutting faces, lugs on the bearing sections engageable in said recesses and provided with line bearing contact portions engaging the bearing seat portions to form axes of oscillation for said shank portions, said bearing sections having abutting faces for maintaining freedom of movement about said axes of oscillation, and sleeve members housing the bearing sections.

ALBERT N. PORTER.